(No Model.)  4 Sheets—Sheet 1.

C. R. JAMES.
AIR BRAKE.

No. 461,243.  Patented Oct. 13, 1891.

WITNESSES.

INVENTOR.

(No Model.) 4 Sheets—Sheet 3.

C. R. JAMES.
AIR BRAKE.

No. 461,243. Patented Oct. 13, 1891.

WITNESSES:

INVENTOR:
Chris R James
By A P Thayer
Atty.

(No Model.)  4 Sheets—Sheet 4.

C. R. JAMES.
AIR BRAKE.

No. 461,243. Patented Oct. 13, 1891.

WITNESSES:

INVENTOR:
Chas R James
By A P Thayer
atty

UNITED STATES PATENT OFFICE.

CHRISTOPHER R. JAMES, OF JERSEY CITY, NEW JERSEY.

AIR-BRAKE.

SPECIFICATION forming part of Letters Patent No. 461,243, dated October 13, 1891.

Application filed January 16, 1890. Renewed July 3, 1891. Serial No. 400,413. (No model.)

*To all whom it may concern:*

Be it known that I, CHRISTOPHER R. JAMES, a subject of Great Britain, and a resident of Jersey City, in the county of Hudson and State of New Jersey, have invented new and useful Improvements in Air-Brakes, of which the following is a specification.

My invention consists of improved valve mechanism for controlling the brake-piston, as hereinafter fully described, reference being made to the accompanying drawings, in which—

Figure 1:
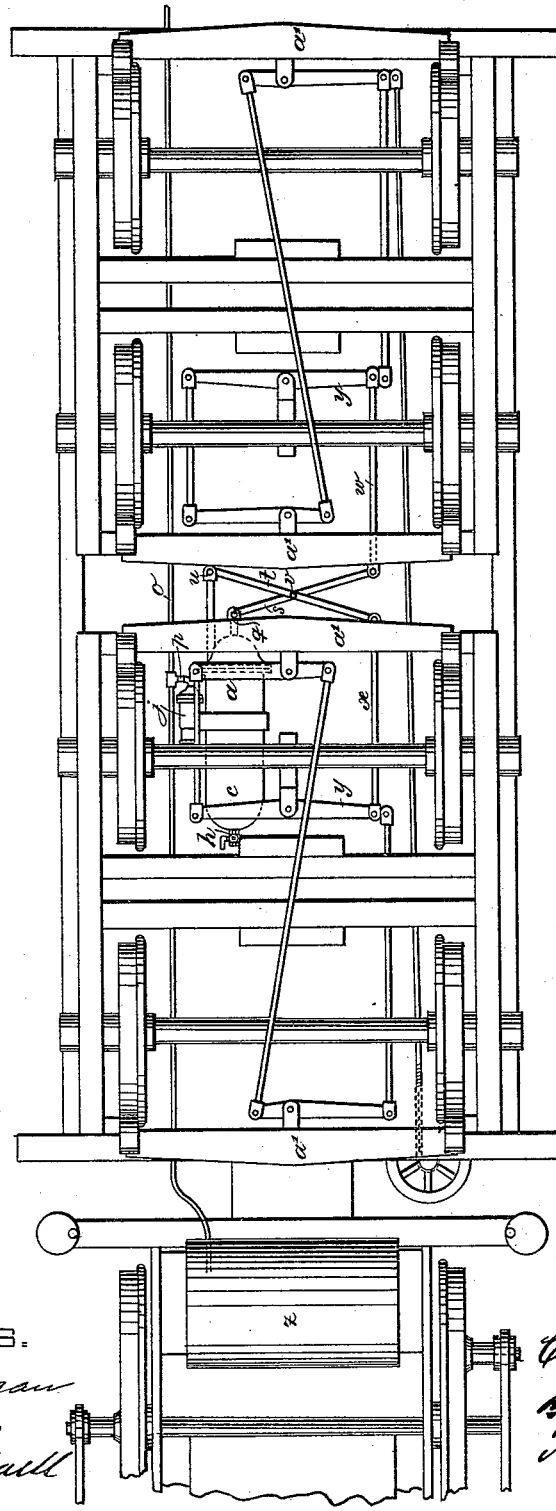
Figure 2:
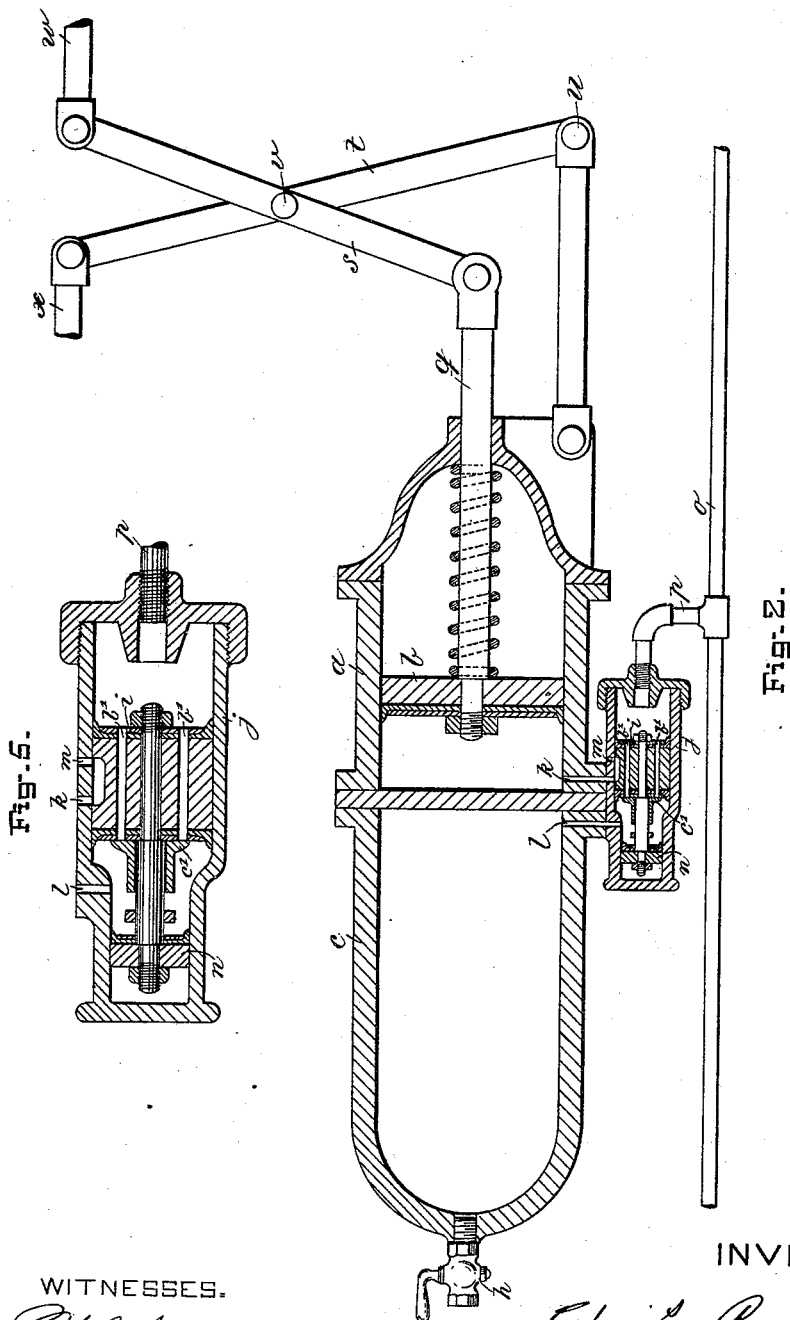
Figure 3:
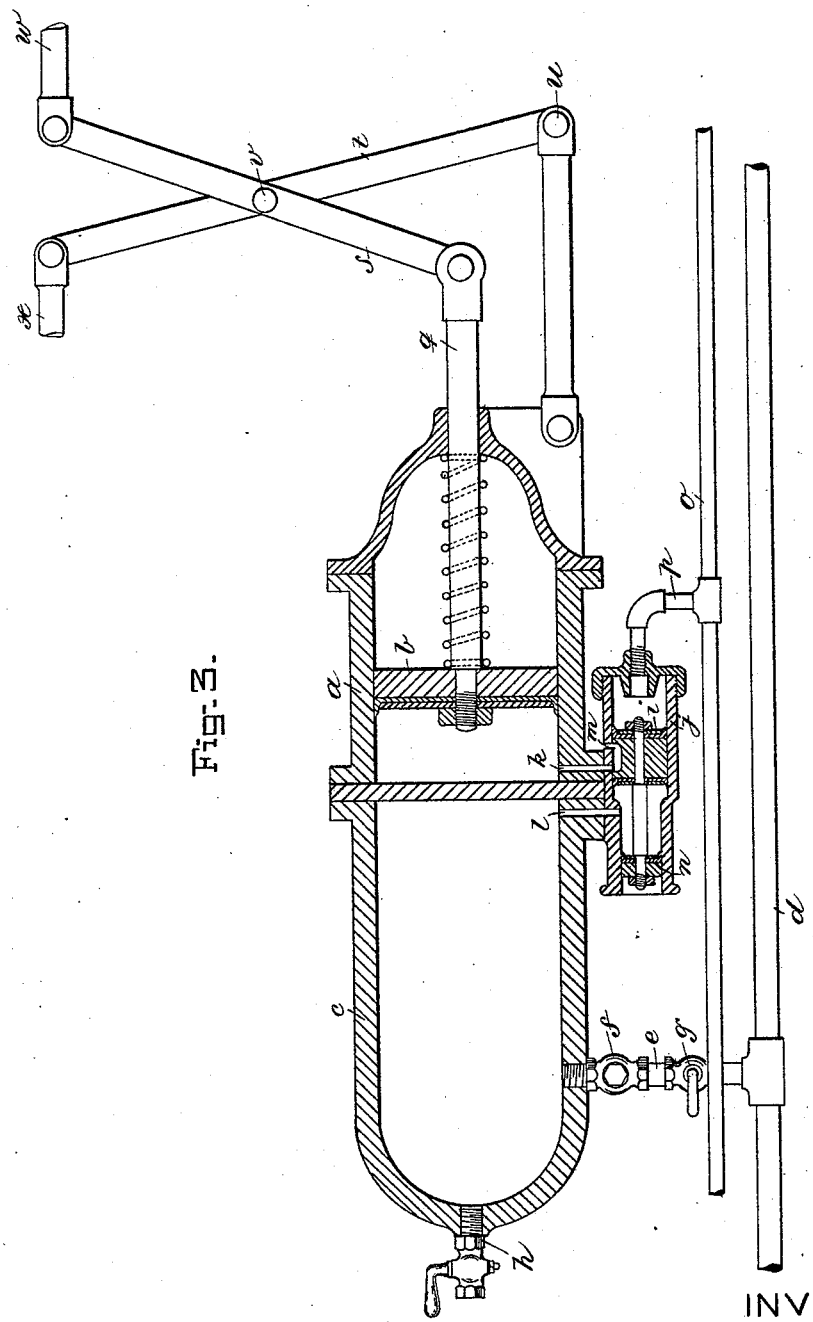
Figures 4, 6:
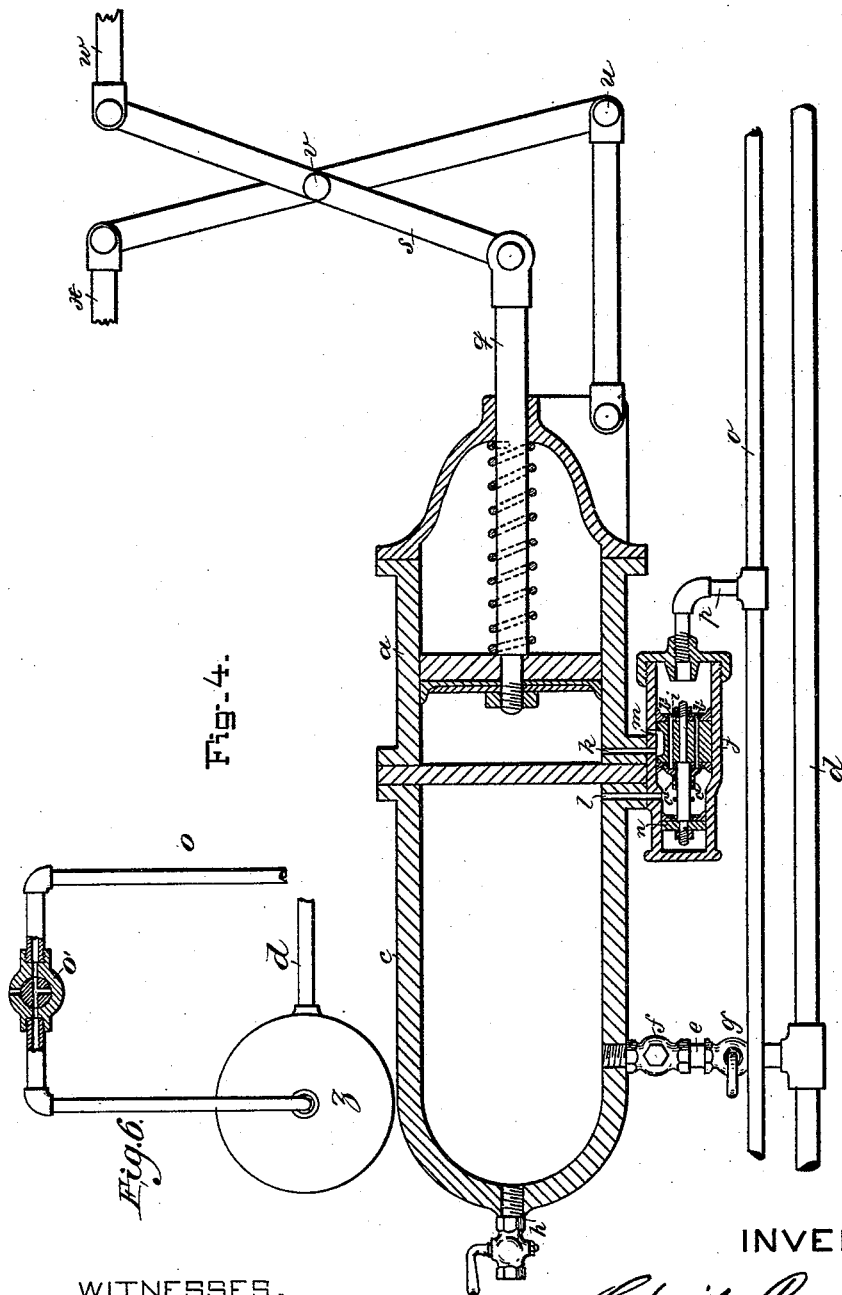

Figure 1 is a plan view of an inverted car having my improved brake apparatus applied to it; it also represents parts of an inverted locomotive. Fig. 2 represents my improved brake apparatus as in Fig. 1, and as I prefer to construct it, partly in horizontal section and partly in plan view, on an enlarged scale. Fig. 3 is a similar view of substantially the same apparatus as it may be arranged in some cases. Fig. 4 is a similar view of the apparatus of Figs. 1 and 2, adapted to be used in the same way as the apparatus of Fig. 3. Fig. 5 is a sectional elevation of the piston-valve on an enlarged scale. Fig. 6 is a detail showing the engineer's controlling-valve.

To the brake-cylinder $a$, in which the brake-piston $b$ works, and having the extension-tank $c$, forming an auxiliary reservoir for compressed air, I connect the valve-case $j$, communicating with the reservoir by port $l$ and with the cylinder $a$ by the port $k$ and having the exhaust-port $m$ and containing the piston-valve $i$, which admits air from the reservoir to the cylinder and closes the communication between them and exhausts the air from the cylinder according as it is shifted to the right hand or the left, and thereby causes the brakes to be applied or released. On the side of the piston-valve $i$ which is open to the reservoir it is partly balanced by the smaller piston $n$. The other side is in communication with the main tank $z$ or with the compressing-pump on the locomotive independently of the main tank, if desired, through the pipe $o$ and branch $p$ and the usual three-way cock $o'$, employed by the engineer to admit air to the brake-piston or exhaust it therefrom. The valve $i$ has passages $b'$ through it admitting air from said main tank or pump into reservoir $c$ through port $l$ and taking effect on piston $n$ to hold valve $i$ in the position maintaining cylinder $a$ open to the exhaust and the brakes free of the wheels. The passages $b'$ are provided with valve $c'$, which, when air is exhausted from valve-case $j$ through pipe $o$ by the engineer's controlling-valve, instantly closes and exposes valve $i$ to pressure by the confined air in reservoir $c$, which instantly shifts said valve, so as to close the exhaust from cylinder $a$ and open said cylinder to the air from the reservoir, which, taking effect on piston $b$, applies the brakes and holds them on so long as the exhaust-passage from the valve-case $j$ is open through pipe $o$ and the engineer's valve; but when air is admitted again by the engineer's valve piston $i$ again shifts back and opens cylinder $b$ to the exhaust.

It will be seen that in case the car should break loose from the train valve-case $j$ will be exhausted through the disconnection of pipe $o$ and valve $i$ will be instantly shifted by the air in reservoir $c$, and the brakes be applied at once and held until reservoir $c$ is exhausted through petcock $h$, with which it is provided for the purpose, and likewise the brakes of all the other cars will also be applied and the train will be stopped; but in some cases it may be preferred to have reservoir $c$ in communication with the main reservoir $z$ on the locomotive through the main pipe $d$ and branch $e$, said branch having a check-valve $f$, in which case the valve having the same connection by pipe $o$ and branch $p$ is operative substantially the same as in Figs. 1 and 2 without the passages $b'$ and valve $c'$. In case of the car breaking loose from the rest the reservoir retains by means of the check-valve a supply that will operate the brakes of the car so detached same as in the other arrangement. There is also a cock $g$ in the branch, which, being shut when the car is disconnected, will, together with the check-valve, retain the reserve supply and hold the brakes on the wheels indefinitely. The reservoir $c$ is also in this case provided with a petcock $h$, by which it may be exhausted when it is desired to release the brakes from a car while disconnected from the locomotive. With this auxiliary reservoir the main tank on the locomotive may be dispensed with, the compressing-pump being in direct connection with the reservoir instead. The valve $i$ is substantially the same in this case, except it is not provided with the passages $b'$ and valve $c'$, as before stated, but is likewise partly balanced by the piston $n$ on the side receiving the air through port $l$ from reservoir $c$, but having the whole area on the other side exposed through pipe $o$ and branch $p$ to pressure from the main tank on the locomotive or to the exhaust of the engineer's valve, according as he admits or exhausts the air thereby.

It will be seen that slight exhaust on valve $i$, through pipe $o$ and branch $p$, will cause the valve to be moved instantly to the right hand by the pressure of the air in reservoir $c$, so as to open communication with cylinder $a$, through ports $l$ and $k$, for actuating the brake-piston and putting on the brakes, and air admitted to valve $i$ again from the locomotive will reverse said valve and exhaust cylinder $a$, through ports $k$ $m$, for releasing the brakes, and will hold the valve in this position until exhaust again occurs for applying the brakes.

The arrangement of Figs. 1 and 2 is adapted for use with one pipe communicating with the locomotive, while in that of Fig. 3 it is contemplated to make use of two such connecting-pipes, which may be preferred in some cases. It will be seen that if the reservoir $c$ of Figs. 1 and 2 be provided with the pipe $d$ and branch $e$ with check-valve $f$ and cock $g$, as shown in Fig. 4, it is alike useful with the one pipe $o$, cock $g$ being closed, and may be coupled with and operative in a train of other cars having the two-pipe arrangement of Fig. 3, cock $g$ then being opened. Besides being a very simple apparatus to construct it is also very simple in operation and very reliable as well, besides the advantage of the more prompt and effective action of the air admitted so directly from the reservoir, and the contrivance of the valve and manner of working it through the confined air of the reservoir, being always in communication with and ready for instantaneous effect on it when the restraining pressure is relaxed, are calculated to insure great efficiency.

For applying the power of the brake-piston so as to distribute it equally on the brakes, I connect the rod $q$ of the brake-piston to one of a pair of levers $s$ $t$, of which the other has a fulcrum at $u$ and both are pivoted together at $v$, about the middle of their length, and both are connected to the rods $w$ $x$, extending to and connecting with the brake-levers $y$, respectively, by which arrangement, it will be seen, the pull on the respective break-beams $a'$ must be exactly alike, as the levers automatically assume the position between the brake-levers $y$, from which they pull alike both ways, both levers being free to play either way on the pivot $u$, for coming to action in the median position. It is preferable to have the fulcrumed lever somewhat longer than the other, because it enables a larger range of movement of the two; but the contrivance works well with both levers of the same length. This affords much more uniform application of the power to the respective break-beams than the common arrangement in which the piston-rod is connected to the lever of one brake-beam, and said lever has the lever of the second brake-beam connected to it; but I reserve this part of my invention for the subject of another application for a patent, and do not claim it herein.

I claim as my invention—

1. The combination, with the auxiliary reservoir and brake-cylinder, of the piston-valve having the larger and smaller heads and controlling the break-cylinder and exhaust-ports by the larger head and being constantly open between said heads to the pressure of the reservoir, and the other side of said larger head in communication with and normally subject to the pressure of the main tank, but subject also to release of said pressure by the engineer's valve, said reservoir being suitably connected with the main tank to be supplied with compressed air, substantially as described.

2. The combination, with the auxiliary reservoir and brake-cylinder, of the piston-valve having the larger and smaller heads and controlling the brake-cylinder and exhaust-ports by the larger head and being constantly open between said heads to the pressure of the reservoir, and on the other side of said larger head in communication with and normally subject to the pressure of the main tank, but also subject to release of said pressure by the engineer's valve, said piston-valve having the check-valve admitting the air from the main tank to the reservoir, substantially as described.

3. The combination, with the auxiliary reservoir and brake-cylinder, of the piston-valve having the larger and smaller heads and controlling the brake-cylinder and exhaust-ports by the larger head and being constantly open between said heads to the pressure of the reservoir, and the other side of said larger head in communication with and normally subject to the pressure of the main tank, but subject also to release of said pressure by the engineer's valve, said piston-valve having the check-valve admitting the air from the main tank to the reservoir, and said reservoir also connected with the main tank by a separate pipe, and said pipe provided with a stop-valve in proximity to the reservoir.

In testimony that I claim the foregoing as my invention I have signed my name, in presence of two witnesses, this 4th day of January, 1890.

CHRISTOPHER R. JAMES.

Witnesses:
 WILFRED B. EARLL,
 W. J. MORGAN.